(12) United States Patent
Mesher

(10) Patent No.: US 10,349,491 B2
(45) Date of Patent: Jul. 9, 2019

(54) LIGHT EMISSION POWER CONTROL APPARATUS AND METHOD

(71) Applicant: TETRA TECH, INC., Pasadena, CA (US)

(72) Inventor: Darel Mesher, Spruce Grove (CA)

(73) Assignee: TETRA TECH, INC., Pasadena, CA (US)

(*) Notice: Subject to any disclaimer, the term of this patent is extended or adjusted under 35 U.S.C. 154(b) by 0 days.

(21) Appl. No.: 15/850,294

(22) Filed: Dec. 21, 2017

(65) Prior Publication Data

US 2018/0220512 A1 Aug. 2, 2018

Related U.S. Application Data

(63) Continuation-in-part of application No. 15/291,335, filed on Oct. 12, 2016, now Pat. No. 9,860,962, which
(Continued)

(51) Int. Cl.
*B61K 9/10* (2006.01)
*H05B 37/02* (2006.01)
(Continued)

(52) U.S. Cl.
CPC ...... *H05B 37/0227* (2013.01); *B61L 15/0081* (2013.01); *B61L 23/04* (2013.01);
(Continued)

(58) Field of Classification Search
CPC ........... B61K 9/02; B61K 9/10; B61L 23/042; B61L 23/044–23/045; B61L 23/047
See application file for complete search history.

(56) References Cited

U.S. PATENT DOCUMENTS 3,562,419 A 2/1971 Stewart et al.
3,942,000 A 3/1976 Dieringer
(Continued)

FOREIGN PATENT DOCUMENTS

CA 2844113 2/2013
CA 2986580 9/2014
(Continued)

OTHER PUBLICATIONS

US 8,548,242 B1, 10/2013, Longacre, Jr. (withdrawn)
(Continued)

*Primary Examiner* — Jason Crawford
(74) *Attorney, Agent, or Firm* — Robinson IP Law, PLLC

(57) ABSTRACT

A system and method for adjusting light emitter output for a railway track inspection system based on data feedback from one or more sensors. The system includes: a power source; a light emitting apparatus emitting light energy toward a railway track; a 3D sensor acquiring three-dimensional data of the railway track; a shaft encoder emitting pulses at a rate that corresponds to a speed of the railway track vehicle; and an algorithm operable on processor to: analyze the three-dimensional data from the 3D sensor; receive pulses from the shaft encoder; and adjust a light emitter control output value based on the analyzed three-dimensional data and the received pulses. A controller in communication with the processor is configured to control the light intensity of the light emitting apparatus in response to the light emitter control output value.

17 Claims, 10 Drawing Sheets

Related U.S. Application Data is a continuation-in-part of application No. 14/724,925, filed on May 29, 2015, now Pat. No. 9,618,335, and a continuation-in-part of application No. 14/724,884, filed on May 29, 2015, now Pat. No. 9,849,894, and a continuation-in-part of application No. 14/724,890, filed on May 29, 2015, now Pat. No. 9,849,895.

(60) Provisional application No. 62/104,888, filed on Jan. 19, 2015, provisional application No. 62/104,882, filed on Jan. 19, 2015, provisional application No. 62/104,886, filed on Jan. 19, 2015.

(51) Int. Cl.
*G01B 11/30* (2006.01)
*B61L 23/04* (2006.01)
*G01B 11/24* (2006.01)
*B61L 15/00* (2006.01)

(52) U.S. Cl.
CPC .......... *B61L 23/044* (2013.01); *B61L 23/045* (2013.01); *B61L 23/047* (2013.01); *G01B 11/24* (2013.01); *G01B 11/303* (2013.01); *B61L 23/041* (2013.01)

(56) References Cited

U.S. PATENT DOCUMENTS

| | | |
|---|---|---|
| 4,040,738 A | 8/1977 | Wagner |
| 4,198,164 A | 4/1980 | Cantor |
| 4,254,545 A | 5/1981 | Slaker |
| 4,265,545 A | 5/1981 | Slaker |
| 4,330,775 A | 5/1982 | Iwamoto et al. |
| 4,490,038 A | 12/1984 | Theurer et al. |
| 4,531,837 A | 7/1985 | Panetti |
| 4,554,624 A | 11/1985 | Wickham et al. |
| 4,600,012 A | 7/1986 | Kohayakawa et al. |
| 4,653,316 A | 3/1987 | Fukuhara |
| 4,676,642 A | 6/1987 | French |
| 4,691,565 A | 9/1987 | Theurer |
| 4,700,223 A | 10/1987 | Shoutaro et al. |
| 4,731,853 A | 3/1988 | Hata |
| 4,775,238 A | 10/1988 | Weber |
| 4,900,153 A | 2/1990 | Weber et al. |
| 4,915,504 A | 4/1990 | Thurston |
| 4,974,168 A | 11/1990 | Marx |
| 5,199,176 A | 4/1993 | Theurer et al. |
| 5,203,089 A | 4/1993 | Trefouel et al. |
| 5,245,855 A | 9/1993 | Burgel et al. |
| 5,353,512 A | 10/1994 | Theurer et al. |
| 5,487,341 A | 1/1996 | Newman |
| 5,493,499 A | 2/1996 | Theurer et al. |
| 5,612,538 A | 3/1997 | Hackel et al. |
| 5,623,244 A | 4/1997 | Cooper |
| 5,627,508 A | 5/1997 | Cooper et al. |
| 5,671,679 A | 9/1997 | Straub et al. |
| 5,721,685 A | 2/1998 | Holland et al. |
| 5,743,495 A * | 4/1998 | Welles, II .............. B61L 23/044 246/121 |
| 5,744,815 A | 4/1998 | Gurevich et al. |
| 5,757,472 A | 5/1998 | Wangler et al. |
| 5,786,750 A | 7/1998 | Cooper |
| 5,791,063 A | 8/1998 | Kesler et al. |
| 5,793,491 A | 8/1998 | Wangler et al. |
| 5,804,731 A | 9/1998 | Jaeggi |
| 5,808,906 A | 9/1998 | Sanchez-Revuelta et al. |
| 5,912,451 A | 6/1999 | Gurevich et al. |
| 5,969,323 A | 10/1999 | Gurevich |
| 5,970,438 A | 10/1999 | Clark et al. |
| 6,025,920 A | 2/2000 | Dec |
| 6,055,322 A | 4/2000 | Salganicoff |
| 6,055,862 A | 5/2000 | Martens |
| 6,062,476 A | 5/2000 | Stern et al. |
| 6,064,428 A | 5/2000 | Trosino et al. |
| 6,069,967 A | 5/2000 | Rozmus et al. |
| 6,128,558 A | 10/2000 | Kernwein |
| 6,243,657 B1 | 6/2001 | Tuck et al. |
| 6,252,977 B1 | 6/2001 | Salganicoff |
| 6,324,912 B1 | 12/2001 | Wooh |
| 6,347,265 B1 | 2/2002 | Bidaud |
| 6,356,299 B1 | 3/2002 | Trosino et al. |
| 6,405,141 B1 | 6/2002 | Carr et al. |
| 6,523,411 B1 | 2/2003 | Mian |
| 6,540,180 B2 | 4/2003 | Anderson |
| 6,570,497 B2 | 5/2003 | Puckette, IV |
| 6,600,999 B2 | 7/2003 | Clark et al. |
| 6,615,648 B1 | 9/2003 | Ferguson et al. |
| 6,647,891 B2 | 11/2003 | Holmes et al. |
| 6,681,160 B2 | 1/2004 | Bidaud |
| 6,715,354 B2 | 4/2004 | Wooh |
| 6,768,551 B2 | 7/2004 | Mian et al. |
| 6,768,959 B2 | 7/2004 | Ignagni |
| 6,804,621 B1 | 10/2004 | Pedanckar |
| 6,854,333 B2 | 2/2005 | Wooh |
| 6,909,514 B2 | 6/2005 | Nayebi |
| 7,023,539 B2 | 4/2006 | Kowalski |
| 7,036,232 B2 | 5/2006 | Casagrande |
| 7,054,762 B2 | 5/2006 | Pagano et al. |
| 7,130,753 B2 | 10/2006 | Pedanekar |
| 7,164,476 B2 | 1/2007 | Shima et al. |
| 7,208,733 B2 | 4/2007 | Mian et al. |
| 7,298,548 B2 | 11/2007 | Mian |
| 7,357,326 B2 | 4/2008 | Hattersley et al. |
| 7,392,595 B2 | 7/2008 | Heimann |
| 7,403,296 B2 | 7/2008 | Farritor et al. |
| 7,412,899 B2 | 8/2008 | Mian et al. |
| 7,463,348 B2 | 12/2008 | Chung |
| 7,499,186 B2 | 3/2009 | Waisanen |
| 7,516,662 B2 | 4/2009 | Nielsen et al. |
| 7,602,937 B2 | 10/2009 | Mian et al. |
| 7,616,329 B2 | 11/2009 | Villar et al. |
| 7,659,972 B2 | 2/2010 | Magnus et al. |
| 7,680,631 B2 | 3/2010 | Selig et al. |
| 7,681,468 B2 | 3/2010 | Verl et al. |
| 7,755,660 B2 | 7/2010 | Nejikovsky et al. |
| 7,755,774 B2 | 7/2010 | Farritor et al. |
| 7,832,281 B2 | 11/2010 | Mian et al. |
| 7,882,742 B1 | 2/2011 | Martens |
| 7,899,207 B2 | 3/2011 | Mian et al. |
| 8,006,559 B2 | 8/2011 | Mian et al. |
| 8,079,274 B2 | 12/2011 | Mian et al. |
| 8,081,320 B2 | 12/2011 | Villar et al. |
| 8,140,250 B2 | 3/2012 | Mian et al. |
| 8,150,105 B2 | 4/2012 | Mian et al. |
| 8,180,590 B2 | 5/2012 | Szwilski et al. |
| 8,188,430 B2 | 5/2012 | Mian et al. |
| 8,190,377 B2 * | 5/2012 | Fu ...................... G01M 99/007 104/93 |
| 8,209,145 B2 | 6/2012 | Paglinco et al. |
| 8,263,953 B2 | 9/2012 | Fomenkar et al. |
| 8,326,582 B2 | 12/2012 | Mian et al. |
| 8,335,606 B2 | 12/2012 | Mian et al. |
| 8,345,099 B2 | 1/2013 | Bloom et al. |
| 8,345,948 B2 | 1/2013 | Zarembski et al. |
| 8,365,604 B2 | 2/2013 | Kahn |
| 8,405,837 B2 | 3/2013 | Nagle, II et al. |
| 8,412,393 B2 * | 4/2013 | Anderson ................ B61K 9/08 246/121 |
| 8,418,563 B2 | 4/2013 | Wigh et al. |
| 8,423,240 B2 | 4/2013 | Mian et al. |
| 8,424,387 B2 | 4/2013 | Wigh et al. |
| 8,478,480 B2 | 7/2013 | Mian et al. |
| 8,485,035 B2 | 7/2013 | Wigh et al. |
| 8,514,387 B2 | 8/2013 | Scherf et al. |
| 8,625,878 B2 | 1/2014 | Haas et al. |
| 8,649,932 B2 | 2/2014 | Mian et al. |
| 8,655,540 B2 | 2/2014 | Mian et al. |
| 8,682,077 B1 | 3/2014 | Longacre, Jr. |
| 8,700,924 B2 | 4/2014 | Mian et al. |
| 8,711,222 B2 | 4/2014 | Aaron et al. |
| 8,724,904 B2 * | 5/2014 | Fujiki .................. G06K 9/6284 382/104 |
| 8,806,948 B2 | 8/2014 | Kahn et al. |

(56) References Cited

U.S. PATENT DOCUMENTS

| | | | |
|---|---|---|---|
| 8,818,585 B2 | 8/2014 | Bartonek | |
| 8,820,166 B2 | 9/2014 | Wigh et al. | |
| 8,868,291 B2 | 10/2014 | Mian et al. | |
| 8,903,574 B2 | 12/2014 | Cooper et al. | |
| 8,925,873 B2 | 1/2015 | Gamache et al. | |
| 8,934,007 B2* | 1/2015 | Snead | G01L 1/24 348/125 |
| 8,942,426 B2 | 1/2015 | Bar-Am | |
| 8,958,079 B2 | 2/2015 | Kainer et al. | |
| 9,036,025 B2 | 5/2015 | Haas et al. | |
| 9,049,433 B1 | 6/2015 | Prince | |
| 9,050,984 B2 | 6/2015 | Li et al. | |
| 9,121,747 B2 | 9/2015 | Mian et al. | |
| 9,175,998 B2 | 11/2015 | Turner et al. | |
| 9,177,210 B2 | 11/2015 | King | |
| 9,187,104 B2 | 11/2015 | Fang et al. | |
| 9,195,907 B1 | 11/2015 | Longacre, Jr. | |
| 9,205,849 B2 | 12/2015 | Cooper et al. | |
| 9,205,850 B2 | 12/2015 | Shimada | |
| 9,212,902 B2 | 12/2015 | Enomoto et al. | |
| 9,234,786 B2 | 1/2016 | Groll et al. | |
| 9,255,913 B2 | 2/2016 | Kumar et al. | |
| 9,297,787 B2 | 3/2016 | Fisk | |
| 9,310,340 B2 | 4/2016 | Mian et al. | |
| 9,336,683 B2 | 5/2016 | Inomata et al. | |
| 9,340,219 B2 | 5/2016 | Gamache et al. | |
| 9,346,476 B2 | 5/2016 | Dargy et al. | |
| 9,389,205 B2 | 7/2016 | Mian et al. | |
| 9,423,415 B2 | 8/2016 | Nanba et al. | |
| 9,429,545 B2 | 8/2016 | Havira et al. | |
| 9,441,956 B2 | 9/2016 | Kainer et al. | |
| 9,446,776 B2 | 9/2016 | Cooper et al. | |
| 9,454,816 B2 | 9/2016 | Mian et al. | |
| 9,469,198 B2 | 10/2016 | Cooper et al. | |
| 9,533,698 B2 | 1/2017 | Warta | |
| 9,562,878 B2 | 2/2017 | Graham et al. | |
| 9,571,796 B2 | 2/2017 | Mian et al. | |
| 9,575,007 B2 | 2/2017 | Rao et al. | |
| 9,580,091 B2 | 2/2017 | Kraeling et al. | |
| 9,581,998 B2 | 2/2017 | Cooper et al. | |
| 9,607,446 B2 | 3/2017 | Cooper et al. | |
| 9,618,335 B2 | 4/2017 | Mesher | |
| 9,619,725 B2 | 4/2017 | King | |
| 9,628,762 B2 | 4/2017 | Farritor | |
| 9,671,358 B2 | 6/2017 | Cooper et al. | |
| 9,752,993 B1 | 9/2017 | Thompson et al. | |
| 9,771,090 B2 | 9/2017 | Warta | |
| 9,796,400 B2 | 10/2017 | Puttagunta et al. | |
| 9,810,533 B2 | 11/2017 | Fosburgh et al. | |
| 9,825,662 B2 | 11/2017 | Mian et al. | |
| 9,849,895 B2 | 12/2017 | Mesher | |
| 9,860,962 B2 | 1/2018 | Mesher | |
| 9,921,584 B2 | 3/2018 | Rao et al. | |
| 9,922,416 B2 | 3/2018 | Mian et al. | |
| 9,950,716 B2 | 4/2018 | English | |
| 9,950,720 B2 | 4/2018 | Mesher | |
| 9,981,671 B2 | 5/2018 | Fraser et al. | |
| 9,981,675 B2 | 5/2018 | Cooper et al. | |
| 9,983,593 B2 | 5/2018 | Cooper et al. | |
| 10,043,154 B2 | 8/2018 | King | |
| 10,077,061 B2 | 9/2018 | Schmidt et al. | |
| 10,081,376 B2 | 9/2018 | Singh | |
| 10,086,857 B2 | 10/2018 | Puttagunta et al. | |
| 2001/0045495 A1* | 11/2001 | Olson | B61L 23/044 246/121 |
| 2002/0065610 A1 | 5/2002 | Clark et al. | |
| 2002/0070283 A1 | 6/2002 | Young | |
| 2002/0093487 A1 | 7/2002 | Rosenberg | |
| 2002/0099507 A1 | 7/2002 | Clark et al. | |
| 2002/0150278 A1 | 10/2002 | Wustefeld | |
| 2002/0196456 A1 | 12/2002 | Komiya et al. | |
| 2003/0059087 A1 | 3/2003 | Waslowski et al. | |
| 2003/0062414 A1 | 4/2003 | Tsikos et al. | |
| 2003/0075675 A1 | 4/2003 | Braune et al. | |
| 2003/0140509 A1 | 7/2003 | Casagrande | |
| 2003/0164053 A1 | 9/2003 | Ignagni | |
| 2004/0021858 A1 | 2/2004 | Shima et al. | |
| 2004/0088891 A1 | 5/2004 | Theurer | |
| 2004/0122569 A1 | 6/2004 | Bidaud | |
| 2004/0189452 A1 | 9/2004 | Li | |
| 2004/0263624 A1 | 12/2004 | Nejikovsky | |
| 2005/0279240 A1 | 12/2005 | Pedanekar et al. | |
| 2006/0017911 A1* | 1/2006 | Villar | B61K 9/08 356/4.01 |
| 2006/0098843 A1* | 5/2006 | Chew | B61K 9/08 382/103 |
| 2006/0171704 A1 | 8/2006 | Bingle | |
| 2007/0136029 A1 | 6/2007 | Selig et al. | |
| 2007/0150130 A1 | 6/2007 | Welles | |
| 2008/0177507 A1 | 7/2008 | Mian et al. | |
| 2008/0212106 A1 | 9/2008 | Hoffmann | |
| 2008/0298674 A1 | 12/2008 | Baker | |
| 2008/0303656 A1* | 12/2008 | Mathews, Jr. | B61L 1/20 340/540 |
| 2008/0304065 A1* | 12/2008 | Hesser | E01B 35/00 356/400 |
| 2008/0304083 A1 | 12/2008 | Farritor et al. | |
| 2009/0040503 A1 | 2/2009 | Kilian | |
| 2009/0073428 A1* | 3/2009 | Magnus | B61K 9/08 356/237.1 |
| 2009/0196486 A1 | 8/2009 | Distante et al. | |
| 2009/0273788 A1 | 11/2009 | Nagle et al. | |
| 2009/0319197 A1 | 12/2009 | Villar | |
| 2010/0007551 A1 | 1/2010 | Pagliuco | |
| 2010/0289891 A1 | 11/2010 | Akiyama | |
| 2011/0064273 A1 | 3/2011 | Zarembski et al. | |
| 2011/0209549 A1 | 9/2011 | Kahn | |
| 2012/0026352 A1 | 2/2012 | Natroshvilli et al. | |
| 2012/0051643 A1 | 3/2012 | Ha et al. | |
| 2012/0192756 A1 | 8/2012 | Miller et al. | |
| 2012/0218868 A1 | 8/2012 | Kahn et al. | |
| 2013/0170709 A1 | 7/2013 | Distante et al. | |
| 2013/0317676 A1 | 11/2013 | Cooper et al. | |
| 2014/0129154 A1 | 5/2014 | Cooper | |
| 2014/0142868 A1 | 5/2014 | Bidaud | |
| 2014/0151512 A1* | 6/2014 | Cooper | B61L 23/04 246/1 C |
| 2014/0177656 A1 | 6/2014 | Mian et al. | |
| 2014/0333771 A1 | 11/2014 | Mian et al. | |
| 2014/0339374 A1 | 11/2014 | Mian et al. | |
| 2015/0131108 A1 | 5/2015 | Kainer et al. | |
| 2015/0219487 A1 | 8/2015 | Maraini | |
| 2015/0225002 A1 | 8/2015 | Branka et al. | |
| 2015/0268172 A1 | 9/2015 | Naithani et al. | |
| 2015/0269722 A1 | 9/2015 | Naithani et al. | |
| 2015/0284912 A1 | 10/2015 | Delmonico et al. | |
| 2015/0285688 A1 | 10/2015 | Naithani et al. | |
| 2016/0002865 A1 | 1/2016 | English | |
| 2016/0039439 A1 | 2/2016 | Fahmy et al. | |
| 2016/0059623 A1 | 3/2016 | Kilian | |
| 2016/0121912 A1 | 5/2016 | Puttagunta et al. | |
| 2016/0159381 A1 | 6/2016 | Fahmy | |
| 2016/0207551 A1 | 7/2016 | Mesher | |
| 2016/0209003 A1 | 7/2016 | Mesher | |
| 2016/0212826 A1 | 7/2016 | Mesher | |
| 2016/0249040 A1* | 8/2016 | Mesher | H04N 13/0242 |
| 2016/0304104 A1 | 10/2016 | Witte et al. | |
| 2016/0305915 A1 | 10/2016 | Witte et al. | |
| 2016/0312412 A1 | 10/2016 | Schrunk, III | |
| 2016/0318530 A1 | 11/2016 | Johnson | |
| 2016/0368510 A1 | 12/2016 | Simon et al. | |
| 2017/0029001 A1 | 2/2017 | Berggren | |
| 2017/0034892 A1 | 2/2017 | Mesher | |
| 2017/0066459 A1 | 3/2017 | Singh | |
| 2017/0106885 A1 | 4/2017 | Singh | |
| 2017/0106887 A1 | 4/2017 | Mian et al. | |
| 2017/0203775 A1 | 7/2017 | Mesher | |
| 2017/0205379 A1 | 7/2017 | Prince | |
| 2017/0267264 A1 | 9/2017 | English et al. | |
| 2017/0305442 A1 | 10/2017 | Viviani | |
| 2017/0313332 A1 | 11/2017 | Paget et al. | |
| 2017/0336293 A1 | 11/2017 | Kondo et al. | |
| 2018/0038957 A1 | 2/2018 | Kawazoe et al. | |
| 2018/0039842 A1 | 2/2018 | Schuchmann et al. | |

(56) References Cited

U.S. PATENT DOCUMENTS

| | | |
|---|---|---|
| 2018/0057030 A1 | 3/2018 | Puttagunta et al. |
| 2018/0079433 A1 | 3/2018 | Mesher |
| 2018/0079434 A1 | 3/2018 | Mesher |
| 2018/0106000 A1 | 4/2018 | Fruehwirt |
| 2018/0127006 A1 | 5/2018 | Wade |
| 2018/0220512 A1 | 8/2018 | Mesher |
| 2018/0276494 A1 | 9/2018 | Fernandez |
| 2018/0281829 A1 | 10/2018 | Euston et al. |
| 2018/0339720 A1 | 11/2018 | Singh |
| 2019/0039633 A1 | 2/2019 | Li |

FOREIGN PATENT DOCUMENTS

| | | |
|---|---|---|
| CA | 2732971 | 1/2016 |
| CA | 2996128 | 3/2016 |
| CA | 2860073 | 5/2016 |
| CN | 106291538 A | 1/2017 |
| CN | 106364503 A | 2/2017 |
| CN | 106373191 A | 2/2017 |
| CN | 106384190 A | 2/2017 |
| CN | 104535652 B | 6/2017 |
| CN | 107688024 A | 2/2018 |
| CN | 206984011 U | 2/2018 |
| CN | 108009484 A | 5/2018 |
| CN | 108657222 | 10/2018 |
| DE | 10040139 A1 | 7/2002 |
| DE | 60015268 | 3/2005 |
| DE | 102012207427 A1 | 7/2013 |
| EP | D274081 | 7/1988 |
| EP | 1079322 | 2/2001 |
| EP | 1146353 | 10/2001 |
| EP | 1158460 | 11/2001 |
| EP | 1168269 | 1/2002 |
| EP | 1600351 | 1/2007 |
| EP | 1892503 | 7/2007 |
| EP | 1964026 | 9/2008 |
| EP | 1992167 | 5/2016 |
| EP | 3024123 | 5/2016 |
| EP | 2806065 | 9/2016 |
| EP | 3138753 A1 | 3/2017 |
| EP | 3138754 A1 | 3/2017 |
| EP | 2697738 | 8/2017 |
| EP | 2998927 | 9/2018 |
| FR | 2674809 A1 | 10/1992 |
| FR | 3049255 A1 | 9/2017 |
| FR | 3049255 B1 | 4/2018 |
| GB | 2265779 | 10/1993 |
| GB | 2378344 | 2/2003 |
| GB | 2536746 | 9/2016 |
| GB | 2536746 B | 3/2017 |
| JP | 60039555 | 3/1985 |
| JP | 53302314 | 12/1988 |
| JP | 5011316 | 1/1994 |
| JP | 06322707 | 11/1994 |
| JP | H07146131 | 6/1995 |
| JP | 7280532 | 10/1995 |
| JP | H07294443 | 11/1995 |
| JP | H07294444 | 11/1995 |
| JP | H0924828 | 1/1997 |
| JP | 10332324 | 12/1998 |
| JP | 11172606 | 6/1999 |
| JP | 2000221146 | 8/2000 |
| JP | 2000241360 | 9/2000 |
| JP | 2002294610 | 10/2002 |
| JP | 2003074004 | 3/2003 |
| JP | 2003121556 | 4/2003 |
| JP | 2004132881 | 4/2004 |
| JP | 2007240342 | 9/2007 |
| JP | 4008082 | 11/2007 |
| JP | 5283548 | 9/2013 |
| JP | 5812595 | 11/2015 |
| JP | 2015209205 | 11/2015 |
| JP | 2017020862 | 1/2017 |
| JP | 5327413 B2 | 5/2018 |
| KR | 101562635 | 10/2015 |
| KR | 101706271 B1 | 2/2017 |
| KR | 1020180061929 A | 6/2018 |
| RU | 2142892 | 12/1999 |
| RU | 101851 | 1/2011 |
| SU | 1418105 | 8/1988 |
| WO | 2005098352 | 10/2005 |
| WO | 2006008292 | 1/2006 |
| WO | WO2011002534 | 1/2011 |
| WO | 2013146502 | 3/2013 |
| WO | 2016007393 A3 | 7/2016 |
| WO | 2016168576 | 10/2016 |
| WO | 2016168623 | 10/2016 |
| WO | 2017159701 A1 | 9/2017 |
| WO | 2018207469 | 11/2018 |
| WO | 2018208153 | 11/2018 |
| WO | 2019023613 | 1/2019 |
| WO | 2019023658 | 1/2019 |

OTHER PUBLICATIONS

Kantor, et al., "Automatic Railway Classification Using Surface and Subsurface Measurements" Proceedings of the 3rd International Conference on Field and Service Robitics, pp. 43-48 (2001).

Magnes, Daniel L., "Non-Contact Technology for Track Speed Rail Measurements (ORIAN)" SPIE vol. 2458, pp. 45-51 (1995).

Ryabichenko, et al. "CCD Photonic System for Rail Width Measurement" SPIE vol. 3901, pp. 37-44 (1999).

Shawn Landers et al., "Development and Calibration of a Pavement Surface Performance Measure and Prediction Models for the British Columbia Pavement Management System" (2002).

Zheng Wu, "Hybrid Multi-Objective Optimization Models for Managing Pavement Assetts" (Jan. 25, 2008).

"Pavement Condition Index 101", OGRA's Milestones (Dec. 2009).

"Rail Radar Bringing the Track Into the Office" presentation given to CN Rail Engineering on Jan. 21, 2011.

Rail Radar, Inc. Industrial Research Assistance Program Application (IRAP) (Aug. 10, 2012).

"Rail Radar Automated Track Assessment" paper distributed at the Association of American Railways (AAR) Transportation Test Center in Oct. 2010 by Rail Radar, Inc.

Gingras, Dennis, "Optics and Photonics Used in Road Transportation" (1998).

US Patent and Trademark Office, Non-Final Office Action for U.S. Appl. No. 16/127,956 dated Dec. 31, 2018.

Liviu Bursanescu and François Blais, "Automated Pavement Distress Data Collection and Analysis: a 3-D Approach" (1997).

US Patent and Trademark Office, Non-Final Office Action for U.S. Appl. No. 14/724,925 dated Feb. 26, 2016.

US Patent and Trademark Office, Non-Final Office Action for U.S. Appl. No. 14/724,890 dated Jul. 29, 2016.

US Patent and Trademark Office, Final Office Action for U.S. Appl. No. 14/724,890 dated Nov. 10, 2016.

US Patent and Trademark Office, Non-Final Office Action for U.S. Appl. No. 14/724,890 dated Mar. 24, 2017.

Korean Intellectual Property Office, International Search Report for Int. App. No. PCT/IB2018/058574 dated Feb. 27, 2019.

Korean Intellectual Property Office, Written Opinion of the International Searching Authority for Int. App. No. PCT/IB2018/058574 dated Feb. 27, 2019.

\* cited by examiner

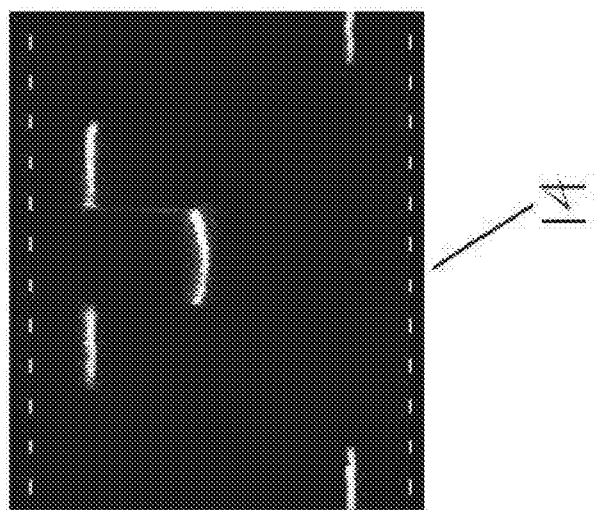
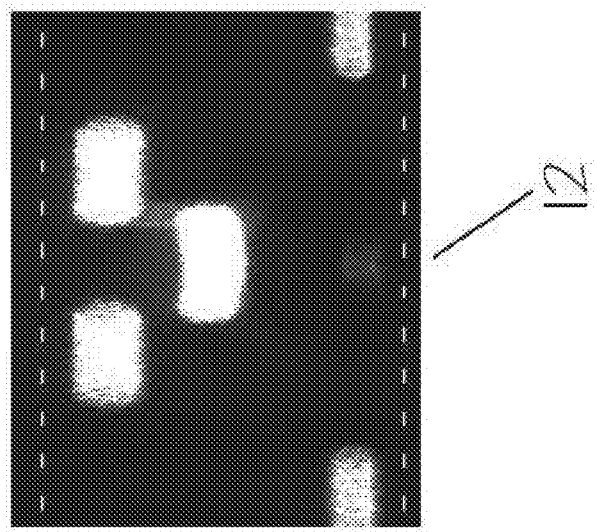
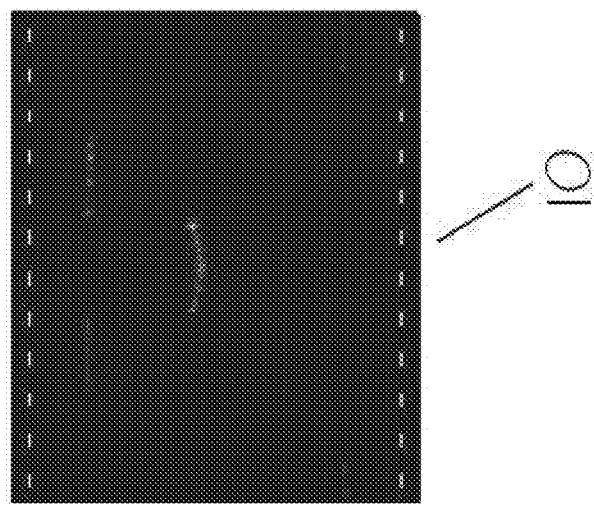
FIG. 2

LIGHT EMISSION POWER CONTROL APPARATUS AND METHOD

CROSS-REFERENCE(S) TO RELATED APPLICATION(S)

This application is a continuation-in-part application claiming priority to U.S. patent application Ser. No. 15/291,335 entitled "LIGHT EMISSION POWER CONTROL APPARATUS AND METHOD" which was filed on Oct. 12, 2016, which claims priority to and is a continuation-in-part of (1) U.S. patent application Ser. No. 14/724,925 entitled "Light Emission Power Control Apparatus and Method" which was filed on May 29, 2015, which claims priority to U.S. Provisional Patent Application Ser. No. 62/104,888 entitled "Laser Power Control Apparatus and Method" which was filed on Jan. 19, 2015; (2) U.S. patent application Ser. No. 14/724,884 entitled "Protective Shroud" which was filed on May 29, 2015, which claims priority to U.S. Provisional Patent Application Ser. No. 62/104,882 entitled "Protective Shroud" which was filed on Jan. 19, 2015; and (3) U.S. patent application Ser. No. 14/724,890 entitled "Sensor Synchronization Apparatus and Method" which was filed on May 29, 2015, which claims priority to U.S. Provisional Patent Application Ser. No. 62/104,886 entitled "Sensor Synchronization Apparatus and Method" which was filed on Jan. 19, 2015. All of the applications listed above are incorporated herein by reference in their respective entireties as if fully set forth herein.

FIELD

This disclosure relates to the field of railway track inspection and assessment systems.

BACKGROUND

Rail infrastructure owners are motivated to minimize staff exposure to unsafe environments and replace the time consuming and subjective process of manual crosstie (track) inspection with objective and automated processes. The motivation is driven by the desire to improve rail safety in a climate of increasing annual rail traffic volumes and increasing regulatory reporting requirements. Objective, repeatable, and accurate track inventory and condition assessment also provide owners with the innovative capability of implementing comprehensive asset management systems which include owner/region/environment specific track component deterioration models. Such rail specific asset management systems would yield significant economic benefits in the operation, maintenance and capital planning of rail networks. A primary goal of such automated systems is the non-destructive high-speed assessment of railway track infrastructure. Track inspection and assessment systems currently exist including, for example, Georgetown Rail (GREX) Aurora 3D surface profile system and Ensco Rail 2D video automated track inspection systems. Such systems typically use coherent light emitting technology, such as laser radiation, to illuminate regions of the railway track bed during assessment operations.

The effect of variations in surface properties of railroad tracks and surrounding surfaces has a significant impact on light levels reflected from these surfaces and subsequently detected by 3D sensors. Reflected light levels entering the sensors are not always optimum due to variations surface color (light or dark colored surfaces) or texture for example. Incorrect lighting levels can cause the 3D track surface profile measured by a 3D sensor to be distorted or imperceptible, affecting the measured profile accuracy.

In such systems, high power laser light sources may be used. Laser line projectors may include high power (Class IV) non-visible infrared laser sources (for example; a wide fan angle (75-90°) laser with a wavelength of 808 nm and a power of 10 watts). All Class IV lasers present an extreme ocular exposure hazard when used without external eye protection. Further complicated by the non-visible nature of infrared radiation (deactivating the natural aversion reflexes such as protective pupil contraction, blink, or head turn), Class IV lasers are capable of causing severe eye damage through direct, or reflected light exposure. Reflected exposure occurs when the laser radiation is scattered from highly reflective specular (shiny) targets such as polished metal surfaces (for example in the track environment; rail heads, switches, frogs). In environments where specular reflections are possible, any potential occurrence of exposure must be removed by eliminating ocular access to the beam. Beam access can be restricted by either requiring that protective eyewear (appropriately filtered) be worn by all those with any exposure potential, or by effectively enclosing the beam.

For rail testing environments with moving surveys using Class IV lasers, the top of the rail head presents a nearly ideal continuous omnidirectional specular reflector. In addition to the rail head, other flat or otherwise smooth surfaces (plates, switches, frogs, the materials between and around the rail head near crossings in urban areas), create conditions where the Maximum Permissible Exposure (MPE) limits for ocular damage are exceeded (especially in situations where those surfaces are wet). Adding to the danger of reflected laser energy, the non-divergent nature of laser sources guarantees that any reflected coherent laser light will present an ocular danger for large distances from the reflecting surfaces.

What is needed, therefore, is a way to control high powered light emitters used in systems similar to those described above in real time in order to limit unnecessary exposure to light emitted from such light emitters.

SUMMARY

A system for inspecting a railway track is disclosed wherein the system includes a power source (e.g., a gas-powered engine providing electrical power, a generator or a battery); an adjustable intensity light emitting apparatus powered by the power source for emitting light energy toward a railway track; and a sensor for sensing the emitted light from the light emitting apparatus and acquiring three dimensional image data of the railway track to be stored in a data storage apparatus. The image data is preferably elevation (or range) and intensity data gathered using a 3D sensor. The system also includes at least one processor for controlling the optical power output of the light emitting apparatus, to adjust and compensate for changes in track bed color and texture variations and improve the ability to measure track bed profiles by 3D sensors. This ability to adjust the optical power output based on track surface characteristics provides improved accuracy railway track elevation and intensity measurements over a much wider range of real world conditions.

In one example the track bed surface is predominantly dark colored due, for example, to the placement of new wooden ties or localized grease contamination from lubricating devices, and the intensity of the light emitting source illuminating the track bed must be increased to reduce the number of undetectable reflected light areas in the profile measured by the 3D sensors. For typical 3D sensors, such dark areas which cause low intensity reflections can result in elevation zero value errors. Elevation zero value errors in 3D elevation and intensity profiles negatively impact the ability to generate accurate 3D elevation and intensity maps of the track bed surface thereby reducing the accuracy of subsequent inspection and assessment analysis.

In a related example the surface of the track bed is light colored due, for example, to the placement of concrete ties or localized light colored surface contaminations from fine soils due to mud holes, and the intensity of the light emitting source illuminating the track bed must be decreased to reduce the number of out-of-range reflected light areas in the profile measured by the 3D sensors. For typical 3D sensors, such high intensity reflections from light colored areas result in sensor saturation or out-of-range intensity conditions which produce invalid elevation measures. High intensity based out-of-range errors in 3D elevation and intensity profiles diminish the ability to generate accurate 3D elevation and intensity maps thereby reducing the accuracy of subsequent track bed inspection and assessments.

To compensate for undesirable light conditions, a system is disclosed for inspecting a railway track configured to adjust the intensity of a light emitting apparatus based on light reflected from a railway track, the system comprising a power source; a light emitting apparatus powered by the power source for emitting light energy toward a railway track; at least one sensor for sensing reflected light emitted from the light emitting apparatus; and a processor in communication with the at least one sensor wherein the processor includes an algorithm for adjusting the power of the light emitting apparatus, the algorithm comprising the steps of (a) calculating one or more intensity histograms based on the reflected light sensed by the at least one sensor; and (b) adjusting a light emitter control output value based at least in part on the calculated one or more intensity histograms; and a controller in communication with the processor wherein the controller is configured to control the light intensity of the light emitting apparatus in response to the light emitter control output value.

In certain embodiments, the algorithm for adjusting the power of the light emitting apparatus further comprises the step of calculating one or more aggregate intensity histograms for a target zone. In some example embodiments, the target zone further comprises at least one surface zone including one or more members selected from the group consisting of a gage tie zone, a rail zone, a field tie zone, and a field ballast zone. In some example embodiments, the algorithm for adjusting the power of the light emitting apparatus further comprises the steps of calculating a median histogram for the target zone and adjusting a light emitter control output value based at least in part on the calculated median histogram.

The algorithm for adjusting the power of the light emitting apparatus may further comprise the steps of calculating aggregate zero value error counts for the target zone and adjusting a light emitter control output value based at least in part on the calculated aggregate zero value error counts. Alternatively, or additionally, the algorithm for adjusting the power of the light emitting apparatus further comprises the steps of calculating aggregate out-of-range error counts for the target zone and adjusting a light emitter control output value based at least in part on the calculated aggregate out-of-range error counts.

The algorithm for adjusting the power of the light emitting apparatus may further comprise the step of determining whether the number of zero value errors are greater than a zero-value error count number threshold. Additionally, or alternatively, the algorithm for adjusting the power of the light emitting apparatus further comprises the step of determining whether the number of out-of-range errors are greater than a range error count number threshold.

A system for inspecting a railway track is disclosed wherein the system is configured for disabling or otherwise cutting off power to a light emitting apparatus under certain conditions. The system is configured for inspecting a railway track configured to adjust the intensity of a light emitting apparatus based on the motion of the system relative to an adjacent railway track. The system is mounted to a railway track vehicle and comprises a power source; a light emitting apparatus powered by the power source for emitting light energy toward a railway track; at least one motion detector for detecting the motion of the system relative to an adjacent railway track; a processor in communication with the at least one motion detector wherein the processor includes an algorithm for adjusting the power of the light emitting apparatus, the algorithm comprising the steps of (a) determining whether the system is moving relative to an adjacent railway track based on incoming data from the at least one motion detector, and (b) adjusting a light emitter control output value based at least in part on incoming data from the at least one motion detector; and a controller in communication with the processor wherein the controller is configured to control the light intensity of the light emitting apparatus in response to the light emitter control output value.

In one embodiment, the algorithm for adjusting the power of the light emitting apparatus further comprises the step of adjusting the light emitter control output value to a value that causes the controller to shut off power to the light emitting apparatus if the system is moving below a minimum speed relative to an adjacent railway track. In another embodiment, the algorithm for adjusting the power of the light emitting apparatus further comprises the step of adjusting the light emitter control output value to a value that causes the controller to provide power to the light emitting apparatus if the system is moving at or above a minimum speed relative to an adjacent railway track.

In another embodiment, the algorithm for adjusting the power of the light emitting apparatus further comprises the step of adjusting the light emitter control output value to a value that causes the controller to provide power to the light emitting apparatus only for the period of time for which a 3D sensor is acquiring data; otherwise, the light emitter control output value is set to zero. This minimizes the ocular exposure hazard to only the periods when 3D sensor data is being acquired, leaving the majority of the time with no such hazard.

A method of inspecting a railway track bed using a light source with real time adjustable light emission is also disclosed, the method comprising the steps of emitting light from a mobile inspection system comprising a light source wherein the emitted light is emitted toward an adjacent railway track bed; detecting motion of the mobile inspection system relative to the adjacent railway track bed; adjusting a light emitter control output value based on the detected motion of the mobile inspection system; and controlling the light intensity of the light emitting apparatus in response to the adjusted light emitter control output value. In embodiments, the detecting step further comprises detecting the speed of the system relative to the adjacent railway track bed. The adjusting step may further include adjusting the control output value to a value that causes the power to the light emitting apparatus to be shut off if the detected speed of the railway track vehicle falls below a minimum speed threshold. Additionally, or alternatively, the adjusting step may include adjusting the control output value to a value that causes the power to the light emitting apparatus to be activated if the detected speed of the railway track vehicle is equal to or greater than a minimum speed threshold.

The controlling step may further include disabling power to the light emitting apparatus in response to the control output value and/or activating power to the light emitting apparatus in response to the control output value.

A system for inspecting a railway track is also disclosed to adjust the intensity of a light emitting apparatus based on motion of the system relative to an adjacent railway track. In a first aspect, the system includes: a power source; a light emitting apparatus powered by the power source for emitting light energy toward a railway track; at least one 3D sensor for sensing reflected light emitted from the light emitting apparatus and acquiring three-dimensional data of the railway track; at least one shaft encoder for detecting motion of a wheel of the railway track vehicle on which the system is mounted, the shaft encoder emitting pulses at a rate that corresponds to a speed at which the wheel of the railway track vehicle rotates which corresponds to a speed of the railway track vehicle; and a processor in communication with the at least one 3D sensor and at least one shaft encoder wherein the processor includes an algorithm for adjusting the power of the light emitting apparatus. The algorithm includes the steps of: analyzing the three-dimensional data from the at least one 3D sensor; receiving pulses emitted from the at least one shaft encoder; and adjusting a light emitter control output value based at least in part on the analyzed three-dimensional data and the received pulses. A controller in communication with the processor wherein the controller is configured to control the light intensity of the light emitting apparatus in response to the light emitter control output value.

In one embodiment, the 3D sensor acquires a plurality of 3D profiles in the form of 3D sensor exposures wherein each 3D sensor exposure occurs during an exposure time duration including a start exposure time when the exposure time duration begins and an end exposure time when the exposure time duration ends, and wherein each 3D sensor exposure is triggered by a pulse emitted from the shaft encoder.

In another embodiment, the algorithm for adjusting the power of the light emitting apparatus further includes the step of enabling or disabling the power to the light emitting apparatus at different times based on the timing of the received pulses from the at least one shaft encoder.

In yet another embodiment, the algorithm for adjusting the power of the light emitting apparatus further includes the step of adjusting the light emitter control output value at the start exposure time to cause the controller to enable power to the light emitting apparatus and adjusting the light emitter control output value at the end exposure time to cause the controller to disable power to the light emitting apparatus.

In one embodiment, the processor causes each 3D sensor exposure to begin slightly after power to the light emitting apparatus is enabled and end slightly before power to the light emitting apparatus is disabled, thereby ensuring that the light emitting apparatus is fully enabled for the entire duration of each 3D sensor exposure.

In a second aspect, a system for inspecting a railway track configured to adjust the intensity of a light emitting apparatus based on the motion of the system relative to an adjacent railway track wherein the system is mounted to a railway track vehicle includes: a power source; a light emitting apparatus powered by the power source for emitting light energy toward a railway track; at least one 3D sensor for sensing reflected light emitted from the light emitting apparatus and acquiring three-dimensional data of the railway track; at least one motion detection apparatus for detecting the motion of the railway track vehicle on which the system is mounted, the motion detection apparatus providing signals at a rate that corresponds to the speed at which the railway track vehicle is moving; and a processor in communication with the at least one 3D sensor and the at least one motion detection apparatus wherein the processor includes an algorithm for adjusting the power of the light emitting apparatus. The algorithm includes the steps of: receiving signals from the at least one motion detection apparatus; and adjusting a light emitter control output value based at least in part on the received signals. A controller in communication with the processor wherein the controller is configured to control the light intensity of the light emitting apparatus in response to the light emitter control output value.

In one embodiment, the 3D sensor acquires a plurality of 3D profiles in the form of 3D sensor exposures wherein each 3D sensor exposure occurs during an exposure time duration including a start exposure time when the exposure time duration begins and an end exposure time when the exposure time duration ends, and wherein each 3D sensor exposure is triggered by a signal from the at least one motion detection apparatus.

In another embodiment, the algorithm for adjusting the power of the light emitting apparatus further includes the step of enabling or disabling the power to the light emitting apparatus at different times based on the timing of the received signals from the at least one motion detection apparatus.

In yet another embodiment, the algorithm for adjusting the power of the light emitting apparatus further includes the step of adjusting the light emitter control output value at the start exposure time to cause the controller to enable power to the light emitting apparatus and adjusting the light emitter control output value at the end exposure time to cause the controller to disable power to the light emitting apparatus.

In one embodiment, the processor causes each 3D sensor exposure to begin slightly after power to the emitting apparatus is enabled and end slightly before power to the emitting apparatus disabled, thereby ensuring that the light emitting apparatus is fully enabled for the entire duration of each 3D sensor exposure.

In a third aspect, a method of inspecting a railway track bed using a light source with real time adjustable light emission includes the steps of: emitting light from a mobile inspection system mounted to a railway track vehicle, the mobile inspection system having a processor, a controller which operates based on commands from the processor, a light source controlled by the controller, a motion detection apparatus for providing signals to the processor regarding the motion of the railway track vehicle relative to an adjacent railway track bed, and a 3D sensor for capturing and sending image profiles of the adjacent railway track bed to the processor wherein the emitted light is emitted toward the adjacent railway track bed for detection by the 3D sensor; sending signals from the motion detection apparatus to the processor; adjusting a light emitter control output value using the processor wherein such adjusting is based on the signals sent from the motion detection apparatus to the processor; and controlling the light intensity of the light emitting apparatus in response to the adjusted light emitter control output value.

In one embodiment, the step of sending signals from the motion detection apparatus includes sending pulses from a shaft encoder to the processor.

In another embodiment, the method further includes the step of disabling the light source for discrete periods of time based on the signals sent from the motion detection apparatus to the processor.

In yet another embodiment, the discrete periods of time during which the light emitter is disabled correspond to periods of time when the 3D sensor is not capturing an image profile.

In one embodiment, the method further includes the step of enabling the light source for discrete periods of time starting at a time slightly before the 3D sensor captures an image profile and slightly after the 3D sensor has captured an image profile.

In another embodiment, the method further includes the step of analyzing the image profiles gathered by the at least one 3D sensor and wherein the adjusting step further comprises adjusting the light emitter control output value using the processor based on the profiles gathered by the at least one 3D sensor.

In yet another embodiment, the method further includes the step of analyzing the image profiles gathered by the at least one 3D sensor and wherein the adjusting step further includes adjusting the light emitter control output value using the processor based on the profiles gathered by the at least one 3D sensor.

The summary provided herein is intended to provide examples of particular disclosed embodiments and is not intended to limit the scope of the invention disclosure in any way.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 2 shows 3D sensor intensity profile for reflected light levels for dark, light, and normal surfaces, respectively for the profile of the same arbitrary stepped elevation object;

The figures are provided to illustrate concepts of the invention disclosure and are not intended to limit the scope of the invention disclosure to the exact embodiments provided in the figures.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

"Track", "Railway track", "track bed" or "railway track bed" is defined herein to mean a section of railway including the rails, ties, components holding the rails to the ties, and ballast material.

"Sample" or "profile" is defined herein to include a discrete measurement of reflected light during a specifically defined time period.

A "processor" is defined herein to include a processing unit including, for example, one or more microprocessors, an application-specific instruction-set processor, a network processor, a vector processor, a scalar processor, or any combination thereof, or any other control logic apparatus now known or later developed that is capable of performing the tasks described herein, or any combination thereof.

The phrase "in communication with" means that two or more devices are in communication with one another physically (e.g., by wire) or indirectly (e.g., by wireless communication).

"Motion Detector" is broadly defined as anything from a simple motion detector to a device configured to detect the speed of a vehicle such as, for example, a speedometer or a shaft encoder.

Figure 1:
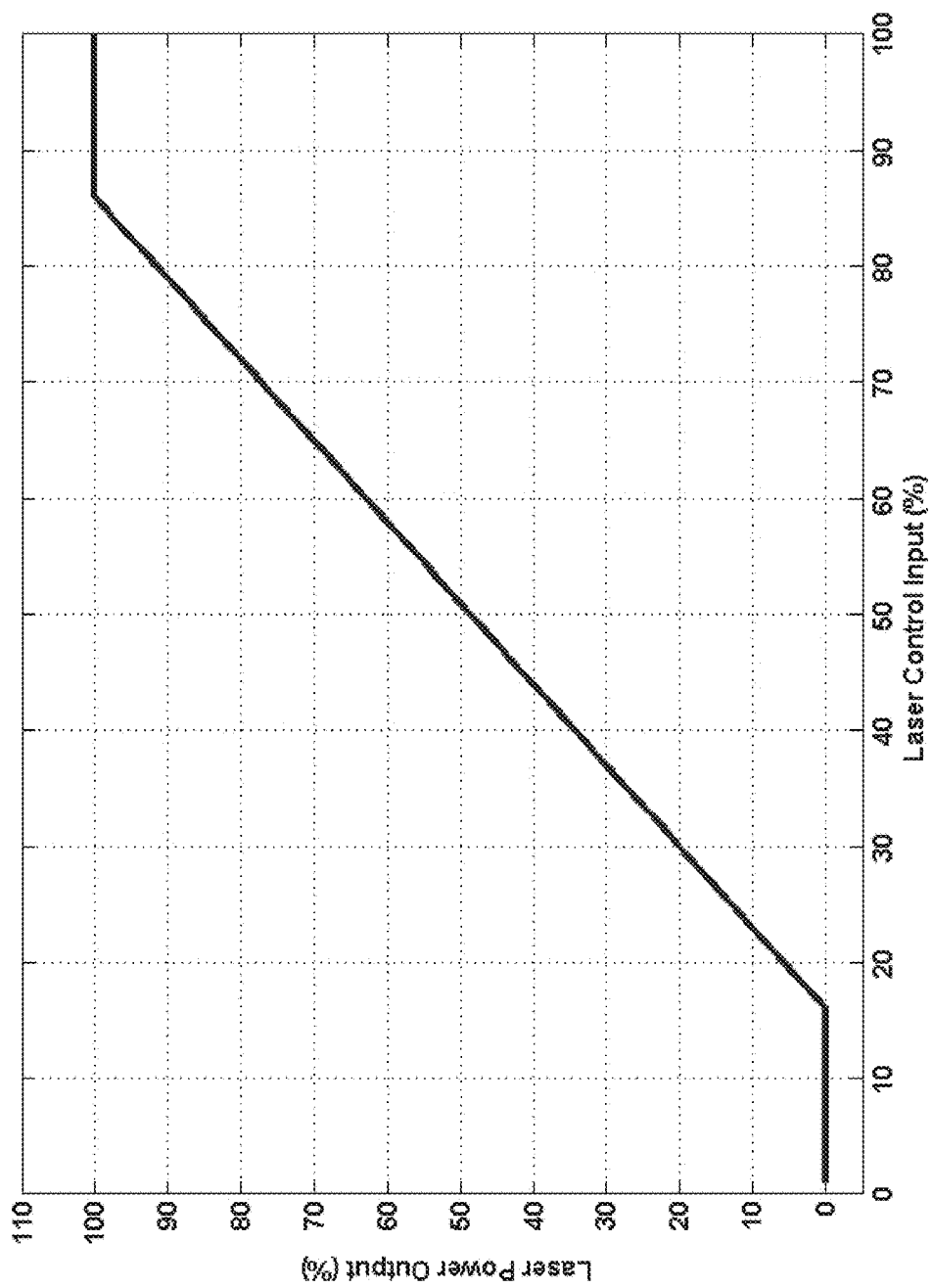
FIG. 1 shows a graphical relationship between the control port input versus output power for a typical light emission source.

Wide fan-angle line generators used in track inspection and assessment systems are typically high-power Class IV, non-visible infrared laser sources (nominally wavelength of 808 nm with a maximum power output of 10 watts in this example embodiment). These laser devices typically have a power control input port, allowing the direct control of the emitted laser optical output power. Based on the control signals applied to the control port, the radiated laser power can be adjusted from 0 to 100 percent of the rated maximum output power. Adjustments to this control port are substantially instantaneous. A graphical representation of a typical laser control port input versus laser output power is shown in FIG. 1.

In a preferred embodiment, the uniform intensity line generated by a wide fan-angle light source is projected onto a surface of a track bed and is reflected and sensed by one or more sensors. The intensity detected by the sensors is a complex function of the characteristics of the surface illuminated by the light source. Of particular importance are the surface properties of texture, uniformity, and color. Changes in surface physical properties result in changes in reflected light levels. Light levels deviating substantially from mid-range negatively impact 3D elevation measurements. Low light levels result in missing or zero values for sections of a measured 3D elevation profile, and excessively high light levels can cause sensor saturation and introduce intensity out-of-range errors that result in measured elevation range errors.

It is not uncommon to have wide variations in the physical surface characteristics affecting reflected light levels during track surveys. These variations can be compensated for by adjusting the radiated light optical power (intensity) based on the track surface conditions on a near real-time basis during survey data collection. To this end, disclosed herein is a method of measuring surface elevation of a track bed using at least one 3D sensor, analyzing measured elevation and intensity data (for elevation zero value errors, out-of-range errors, and intensity distribution) and adjusting light emitter control voltage based on such analysis to improve measured 3D elevation data quality.

Figure 3:
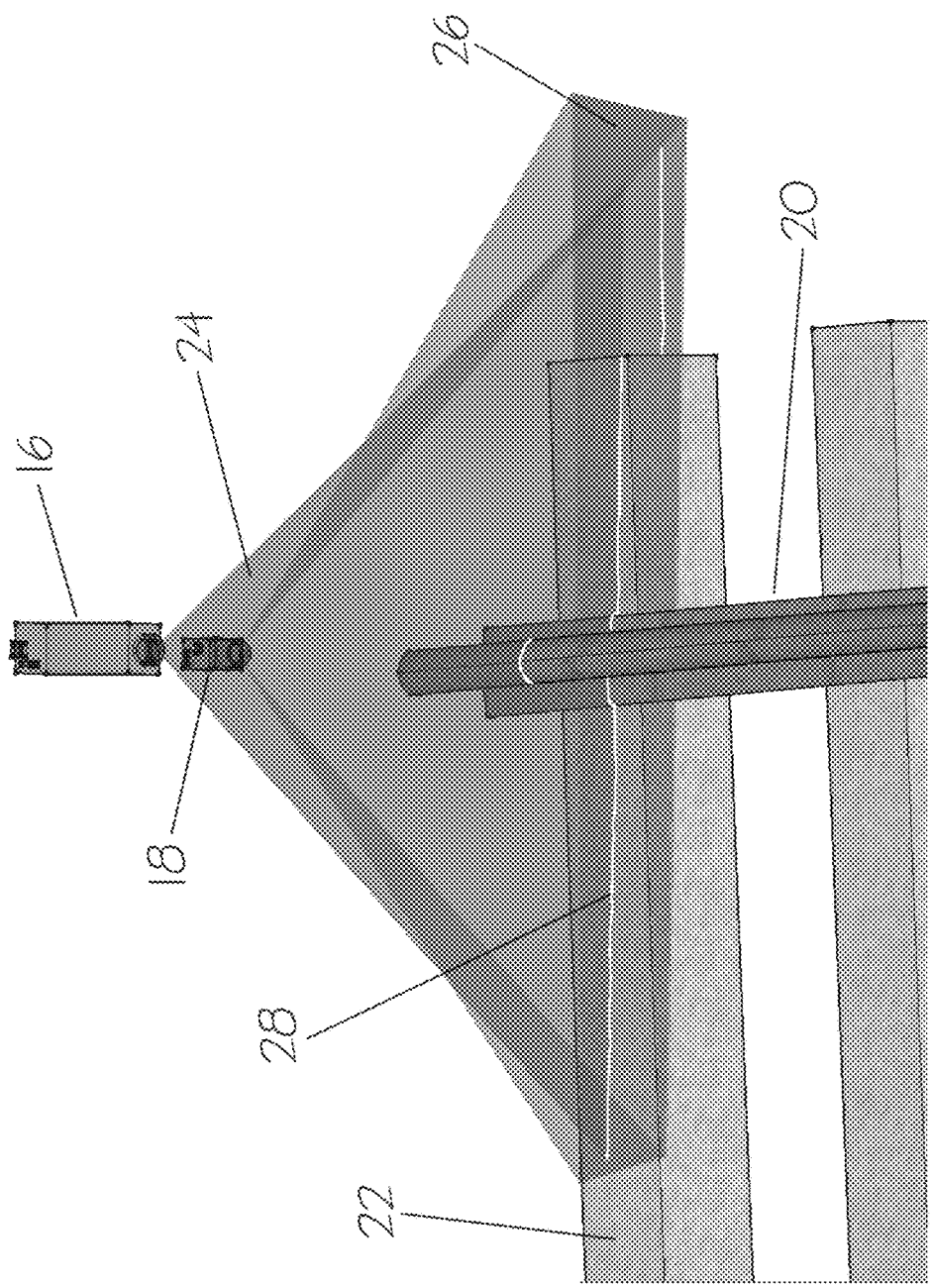
FIG. 3 shows a somewhat schematic diagram of a fixed output light line projector being used to illuminate a normal colored object and the resulting typical reflected normal line intensity detected by a 3D sensor.
Figure 4:
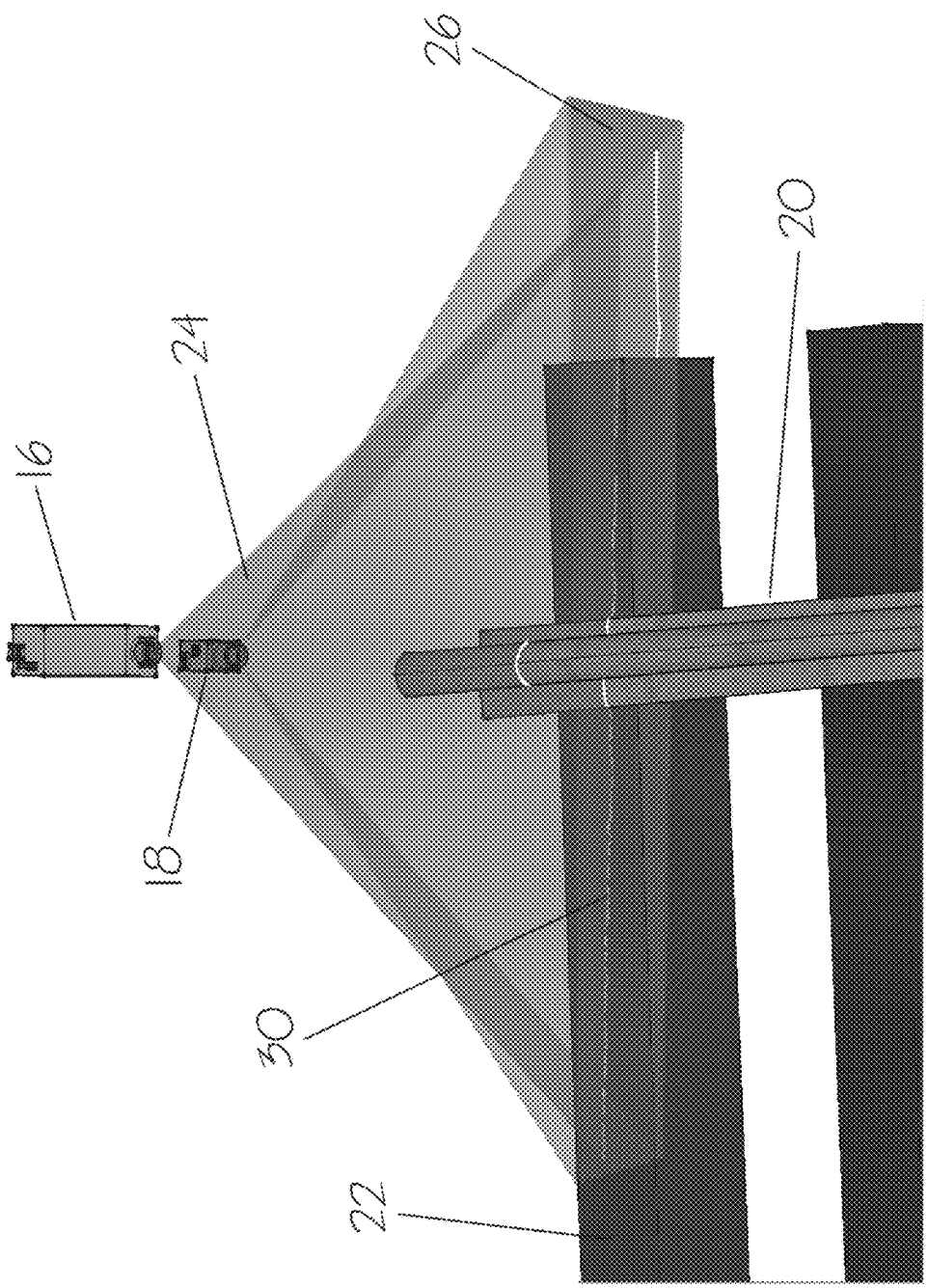
FIG. 4 shows a somewhat schematic diagram of a fixed output light line projector being used to illuminate a dark colored object and the resulting typical reflected low line intensity detected by a 3D sensor.
Figure 5:
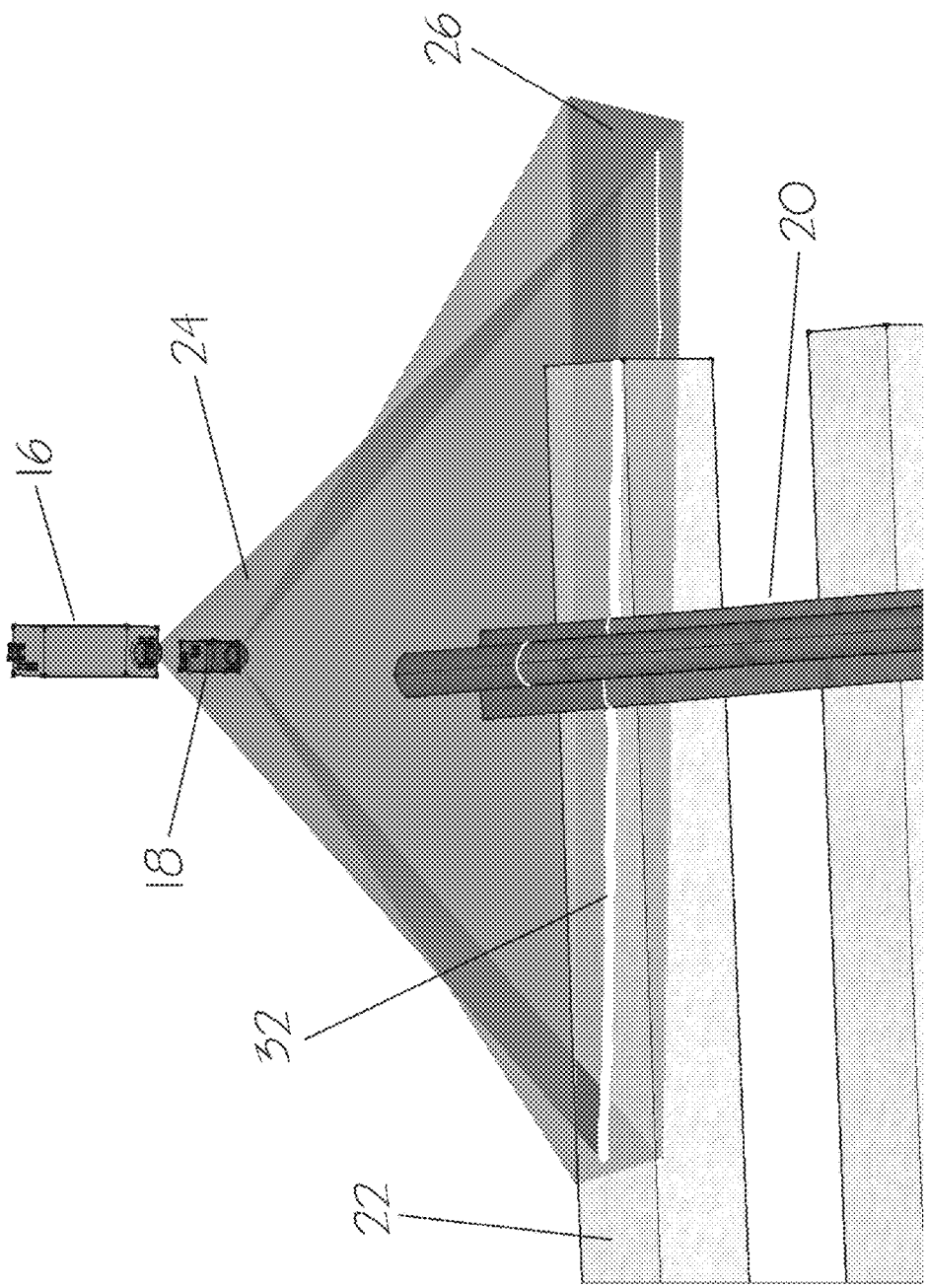
FIG. 5 shows a somewhat schematic diagram of a fixed output light line projector being used to illuminate a light-colored object and the resulting typical reflected high line intensity detected by a 3D sensor

The effect of variations in surface properties (surface color in this example) on light 3D profile line intensity is demonstrated in FIGS. 2 through 5. Dark color surfaces reflect less energy (representing undetectable elevations within the measured profiles which are reported as elevation "Zero Value Errors") as shown in the dark color surface image 10 in FIG. 2, and light color surfaces reflect more light for a given source radiated power (intensity) as shown in the light color surface image 12 in FIG. 2. A normal or average color surface is shown as the normal color surface image 14 in FIG. 2. The effect of surface color on reflected light levels is demonstrated for various crosstie colors in FIGS. 3 through 5. These figures include a light source 16 (e.g., a laser), a 3D sensor 18, a rail 20 and a tie 22. The light source 16 casts a light beam having a wide fan-angle 24. The 3D sensor 18 has a wide field of view 26 as shown in FIG. 3, and a 3D profile 28 can be seen where the light strikes the surface of the tie 22 and rail 20. FIG. 3 shows moderate or normal light conditions resulting in a normal and desirable 3D profile line 28 intensity. FIG. 4 shows an example in which a low 3D profile 30 line intensity is acquired because of the presence of dark colored objects. Finally, FIG. 5 shows a resultant high 3D profile line 32 intensity when light colored objects are encountered.

Figure 6:
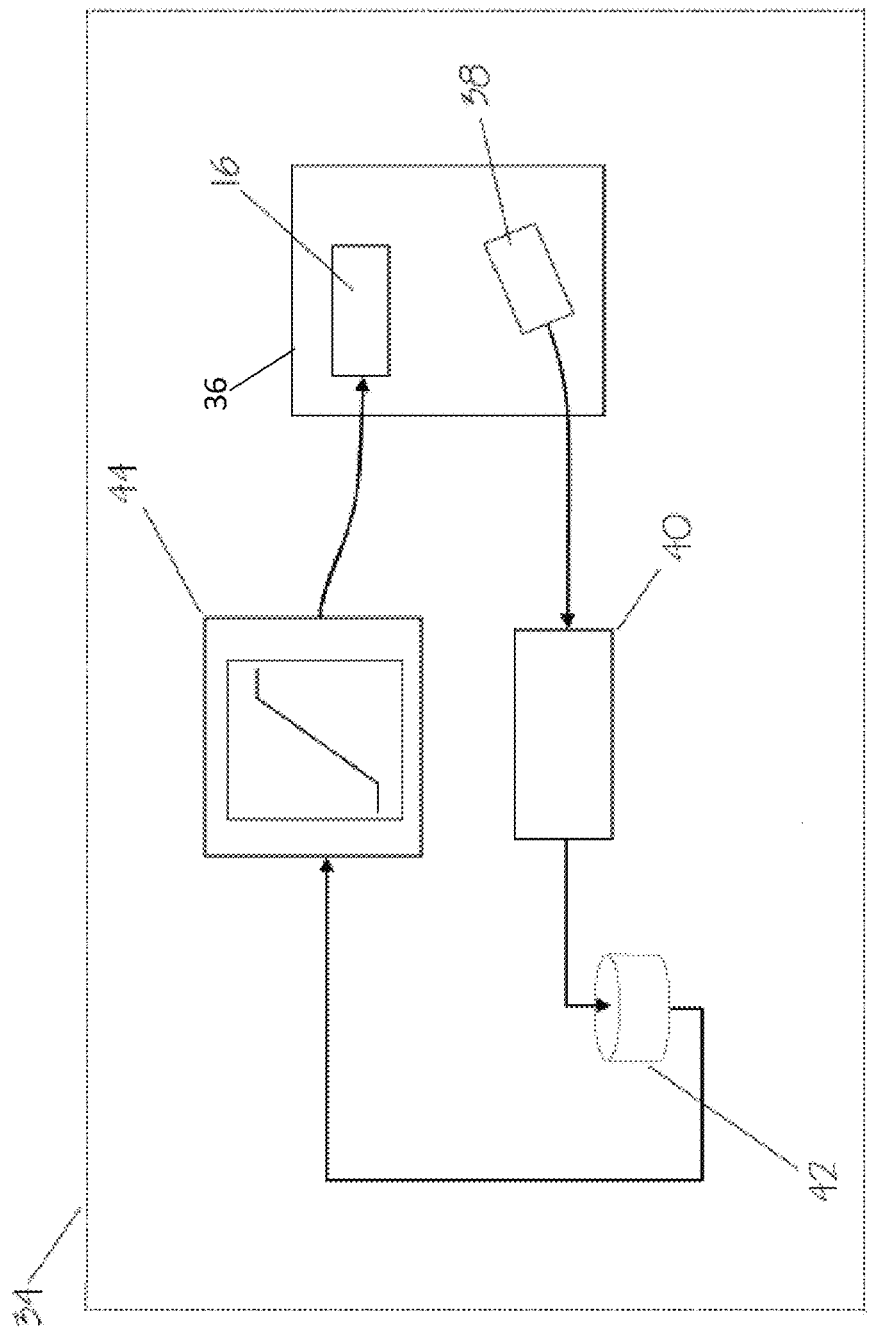
FIG. 6 shows a block diagram of a light emission source power control system.

FIG. 6 shows a light emitter power control system 34 including an enclosure 36 that includes a light source 16 and a 3D sensor 38. A processor 40 is shown for processing data collected from the 3D sensor wherein such data is stored in one or more sensor data storage devices 42. A light power controller 44 in communication with the processor 40 controls the output optical power of the emitted light based on the analysis of data compiled by the 3D sensor 38. The light emitter power control system 34 preferably includes a collection of independent processes operating concurrently during active survey data collection. Processes are defined to interface, control and stream the surface elevation and surface reflection intensity data for each applicable 3D sensor. These data streams are segmented into fixed length and width 3D elevation and intensity maps as separate data files, where each data file is preferably defined for example as 1.6 m wide and 30.5 m long segments of track for each applicable 3D sensor.

Figure 7:
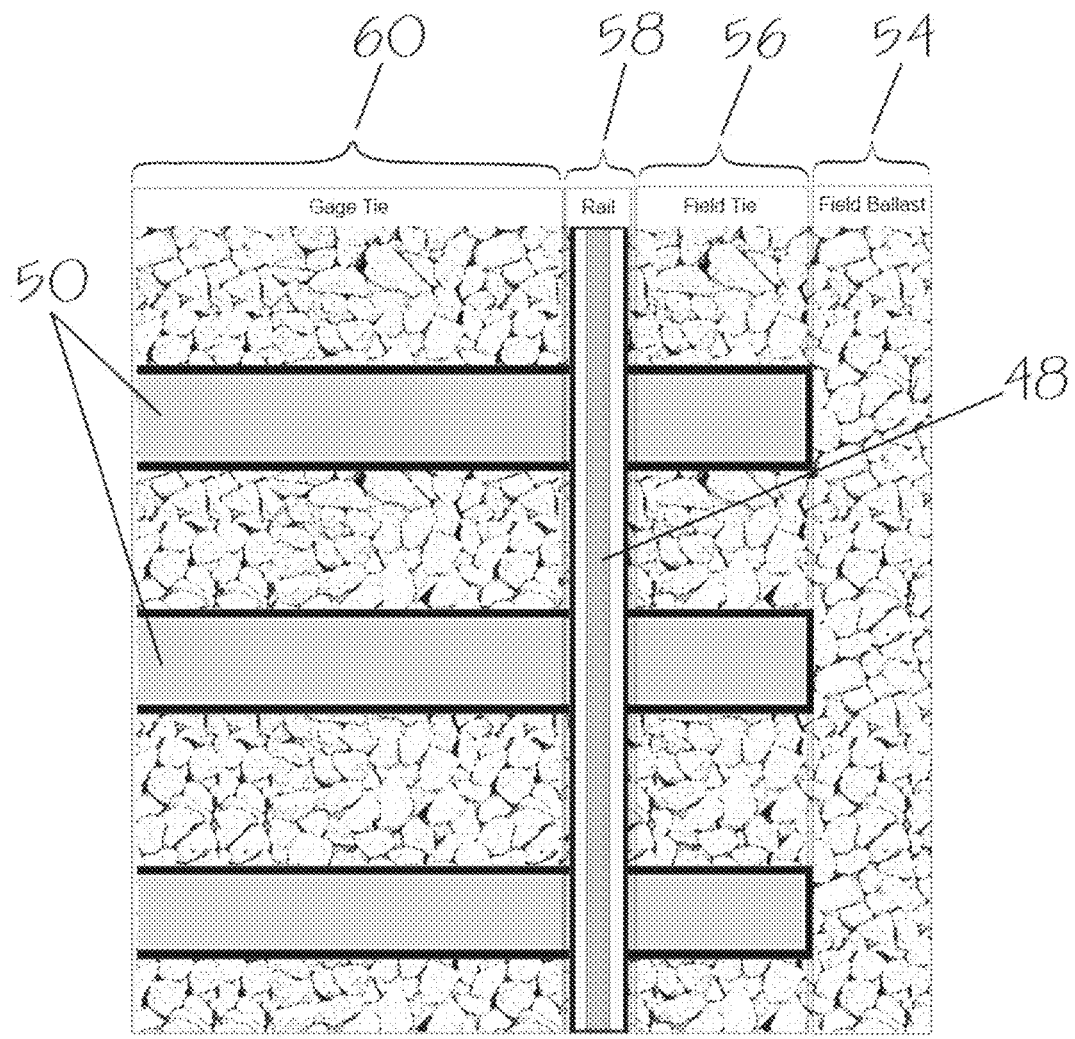
FIG. 7 shows track bed transverse zones defined and used by a light emission power control process to characterize profile intensity data based on the location where the data was gathered.

A primary light emitter power control process running on the processor 40 monitors the 3D sensor elevation and intensity data streams in real time and preferably calculates aggregate 3D surface intensity histograms, an elevation Zero Value Error count, and an Out-of-Range Error count. The mathematical combination or aggregation of individual scan line intensity values, longitudinally in the direction of survey, is an efficient method to produce representative intensity measures required for real-time laser power control. To maximize efficiency and processing speed, intensity values from the same lateral offset, representing the same scan column, are processed in aggregate. The number longitudinal scan line samples aggregated together should be preferably selected to be large enough to minimize the influence of data outliers (more than 1000 values for example) and small enough to be processed in real-time (1000 or less for example). Following fixed column based processing of scan intensity measures over a longitudinal interval, a single aggregate measure is produced for each column. This method of producing aggregate measures for each scan column is applied continuously in the survey direction during data collection. The aggregated intensity measures are further processed to produce histograms for each zone (as shown in FIG. 7, a ballast zone 54, a field tie end zone 56, a rail zone 58, and a gage zone 60) across the track bed. These zones defined by transverse offsets across the track bed are based substantially on sensor location and crosstie dimensions. If, in one example, the zones defined in FIG. 7 have widths of 600 columns for gage tie zone 60, 150 columns for rail zone 58, 470 columns for field tie end zone 56, and 316 columns for ballast zone 54, then the total scan width would be 1536 columns. If in this example, 1000 longitudinal scans are used to calculate the aggregate intensity measures for each zone, then the gage tie zone 60 would result in an input matrix of intensity values that is 1000 rows by 600 columns producing a single aggregate measurement vector of length 600. Similar calculations for the remaining zones would produce aggregated intensity vectors of length 150 for zone 58, length 470 for zone 56, and length 316 for zone 54. A histogram for each of these aggregate zone intensity vectors is then calculated and the histograms are then used for track bed light emitter power control analysis. The process is repeated continuously and in substantially real-time during surveys.

FIG. 7 shows a segment of one half of the track bed surface with a width that is defined by the field of view of a single sensor centered over the rail. The track bed section shown in FIG. 7 contains a rail 48, a plurality of cross ties 50, and four separate transverse light emitter power control analysis zones as described above. These analysis zones correspond to the following: the ballast zone 54, the transverse section of track bed on the field side of the rail containing ballast only; the field tie end zone 56, the transverse section of track bed on the field side of the rail containing crosstie ends; the rail zone 58, the transverse section of track bed containing the rail; and the gage zone 60, the transverse section of track bed on the gage side of the rail containing crossties as shown in FIG. 7. The mean, median, maximum, minimum and other light intensity statistics, for example, are preferably calculated continuously for defined longitudinal intervals (for example, for each 5 meters along the track bed) for each aggregate parameter in each transverse zone. A new sample or profile of light intensity data preferably occurs about every 2 mm to about every 6 mm in the longitudinal direction depending on the speed of the 3D sensor 38.

Figure 8:
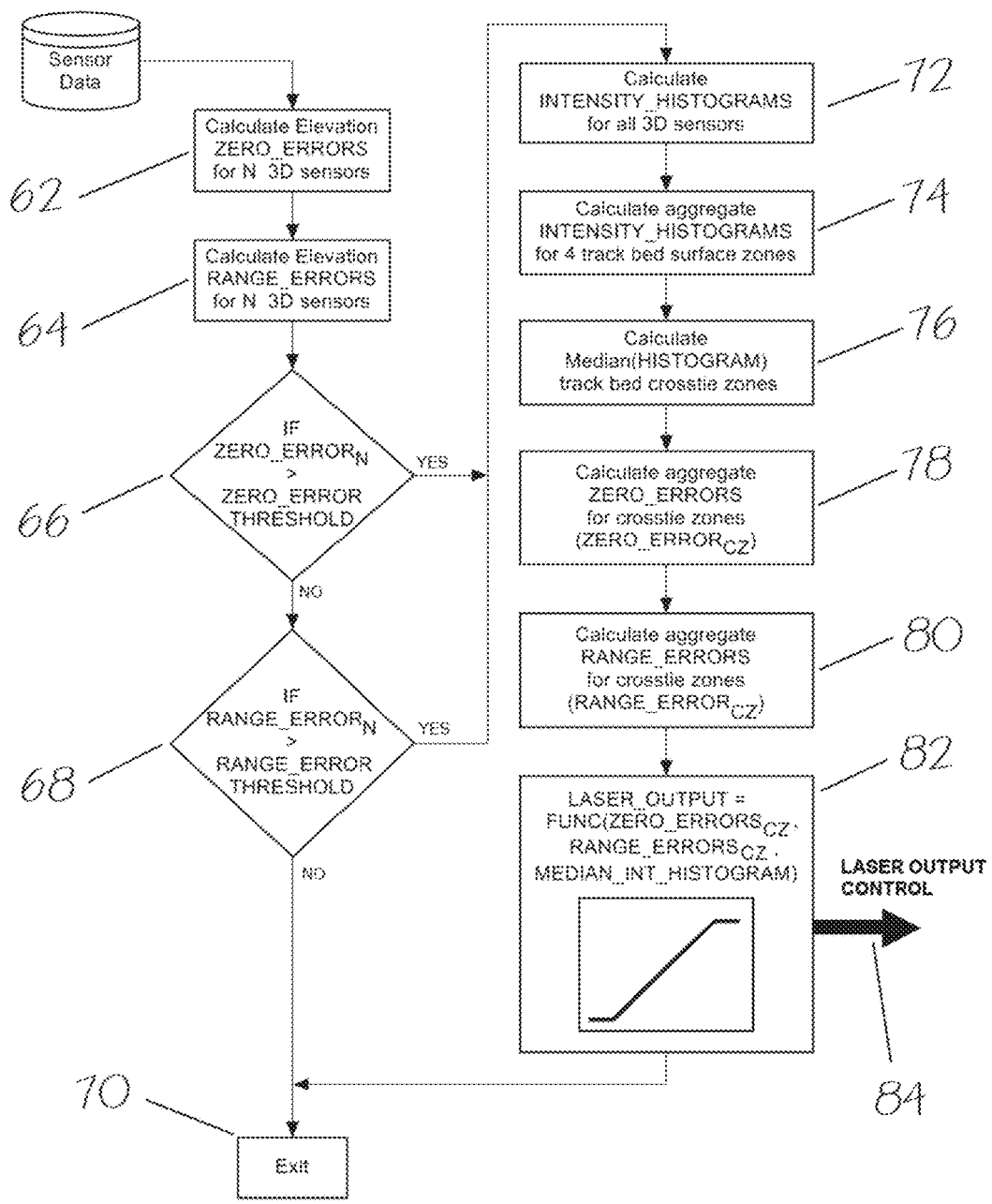
FIG. 8 shows a flow chart illustrating a light emission power control algorithm used by a light emission power control process.

A light emitter power control output value is adjusted if error conditions are detected (based on the Elevation Zero Value Error count and Range Error count) which exceed acceptable maximum error count thresholds. If a significant number of sensor elevation errors or out-of-range intensity errors are detected, the laser control power output level is adjusted based on the track bed surface intensity values for zones containing ties. The updated light emission power control value is increased if the profile intensity median value is less than a target intensity value, and decreased if the intensity median value is greater than the target intensity value. These steps are depicted as an algorithm in the flow chart shown in FIG. 8.

3D sensor data is gathered in real time and zero value errors are calculated for each of the sensors (block 62). Out-of-Range errors are then calculated as shown in block 64. Then, a determination is made as to whether any of the sensor zero value error counts are greater than a predefined zero value error count threshold (block 66). If the maximum number of zero value errors for all sensors is below the zero value error count threshold, and the maximum number of out-of-range errors for all sensors is less than the range error count threshold (block 68) then the system exits without change to the light emitter control output signal as shown in block 70. If, however, any sensor zero value error count exceeds the zero value error count threshold or if any of the sensor out-of-range error counts exceed the range error count threshold, the light emitter power control output signal is adjusted to reduce sensor errors caused by higher than optimum radiated light source optical power. In order to calculate the correct laser control signal adjustment, intensity histograms are calculated for each of the applicable sensors (block 72), and then aggregate intensity histograms are preferably calculated for each of the light emitter power control analysis zones including the field ballast zone, the field tie zone, the rail zone, and the gage tie zone (block 74). Median histograms are then calculated (block 76). Aggregate zero value error counts are then calculated for each analysis zone (block 78), followed by aggregate out-of-range error counts (block 80). Then, light emitter power is adjusted based at least in part on the calculated zero error counts, range error counts and intensity histograms (block 82), resulting in an update of the Light emitter Output Control signal 84.

By providing a way to control laser optical output power based on measurement sensor feedback during railway track inspections, higher quality and more consistent 3D image data are achievable. With higher quality 3D imagery, a more accurate picture of overall railway structure is possible.

Another important issue to consider with the use of high power light emitting devices is safety and eye protection for persons in relative close proximity to light emitting devices. The various embodiments of the system described herein are preferably mounted on a railway track vehicle configured to move and be propelled along a railway track. Railway track vehicles of various kinds including trucks configured for travel along railroads are well known in the art and are not discussed in detail here.

In one embodiment, a system 86 for inspecting a railway track is mounted to a railway track vehicle. The system 86 is configured to adjust the intensity of a light emitting apparatus based on the motion of the system 86 relative to an adjacent railway track. The system 86, shown schematically in FIG. 9, includes a light emitting apparatus 16 for emitting light energy toward a railway track. The system 86 further includes at least one motion detector 88 for detecting the speed of the railway track vehicle on which the system 86 is mounted. The system further includes a processor 90 in communication with the at least one motion detector 88. The processor 90 includes an algorithm for adjusting the power of the light emitting apparatus 16 wherein the algorithm includes the steps of determining whether the system 86 is moving at a minimum speed relative to an adjacent railway track based on incoming data from the at least one motion detector 88, and adjusting a light emitter control output value based at least in part on incoming data from the at least one motion detector 88. The system further includes a controller 92 in communication with the processor 90 wherein the controller 92 is configured to control the light intensity of the light emitting apparatus 16 in response to the light emitter control output value.

When the system is moving below a minimum threshold speed, the processor 90 sends a control output value to the controller 92 that causes the controller to disable the light emitting apparatus 16 so that no light is emitted. The minimum threshold speed can be set at zero units of distance per time or another setting such as, for example, 2 miles per hour. When the system 86 is not moving along a track, the light emitting apparatus 16 is not being used to help gather data. Since there is a health risk with exposure to light emitted from the light emitting apparatus 16, the system 86 shuts off the light emitting apparatus 16 while it is not needed to help gather data. When the system 86 begins moving again above the minimum threshold speed, the light emitter control output value changes to a value that causes the controller 92 to activate or reactivate the light emitting apparatus 16. In one embodiment, the motion detector 88 only detects relative motion and does not detect speed. If the system 86 is in motion relative to an adjacent railway track, the light emitter control output value is set to a setting that causes the controller 92 to activate the light emitting apparatus 16. If the system 86 is not in motion relative to an adjacent railway track, the light emitter control output value is set to a setting that causes the controller 92 to deactivate the light emitting apparatus 16.

In a preferred embodiment, the motion detector 88 is a shaft encoder that produces pulses at a rate that corresponds to the speed at which a shaft rotates. The shaft encoder is configured to operate in conjunction with a shaft of the railway track vehicle on which the system 86 is mounted. So, when the railway track vehicle is not moving, the shaft encoder produces zero pulses. When the railway track vehicle is moving, the shaft encoder provides information to the processor 90 including the speed of the system 86 relative to an adjacent railway track.

The system 86 described above provides a number of important advantages including providing a system for automatically activating and deactivating a high-powered light emitting device based on motion of the system relative to an adjacent railway track. The system 86 allows for a minimum speed to be set so that a light emitting device is deactivated when the system speed falls below the minimum speed, thereby eliminating the eye exposure hazards associated with such high-powered light emitting devices during times when the system or associated components are not actively scanning the adjacent railway track. When the system resumes motion and scanning, the system reactivates the light emitting device.

Figure 9:
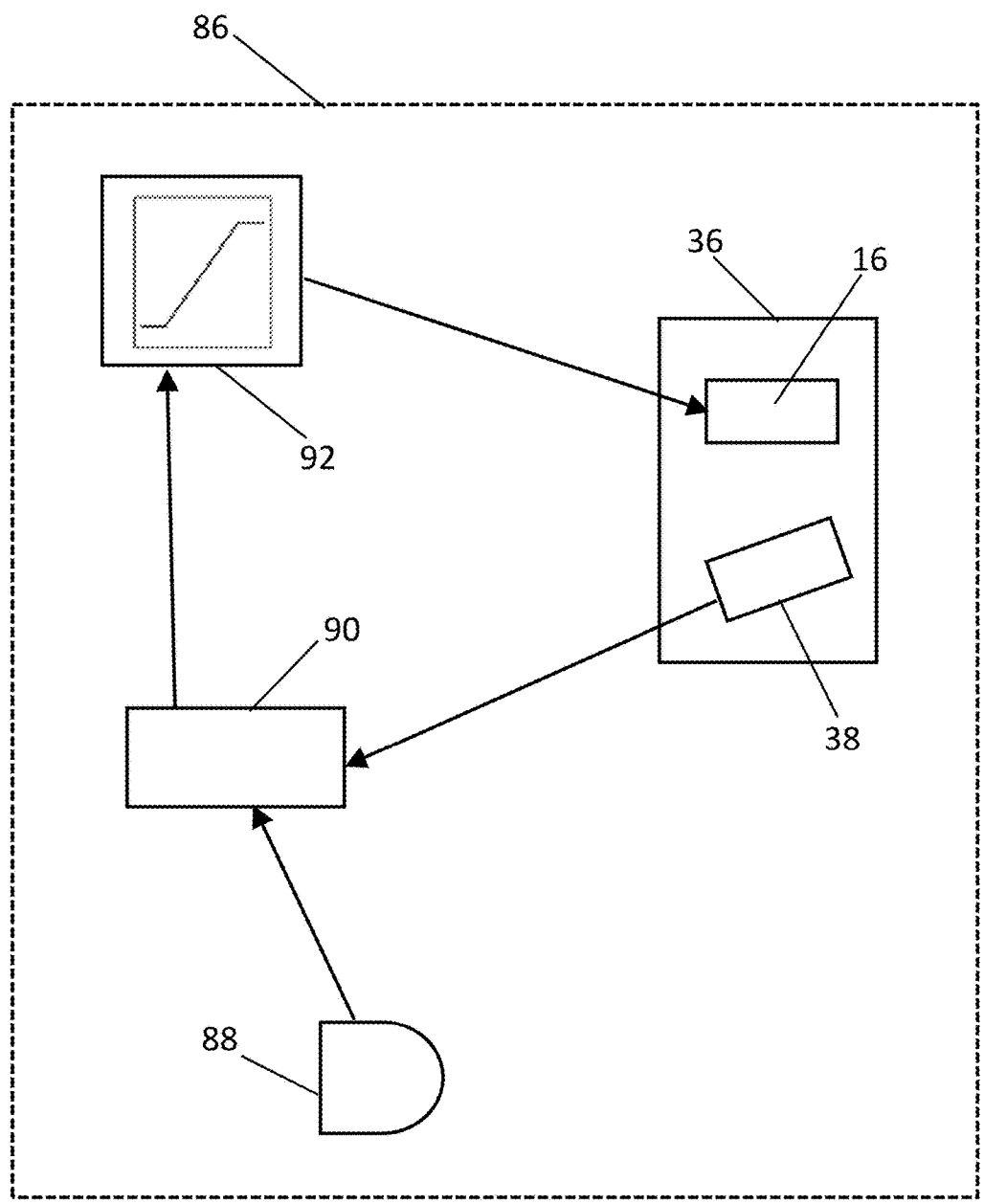
FIG. 9 shows a schematic diagram of a light emission source power control system configured to activate or deactivate a light emission apparatus under certain conditions.
Figure 10:
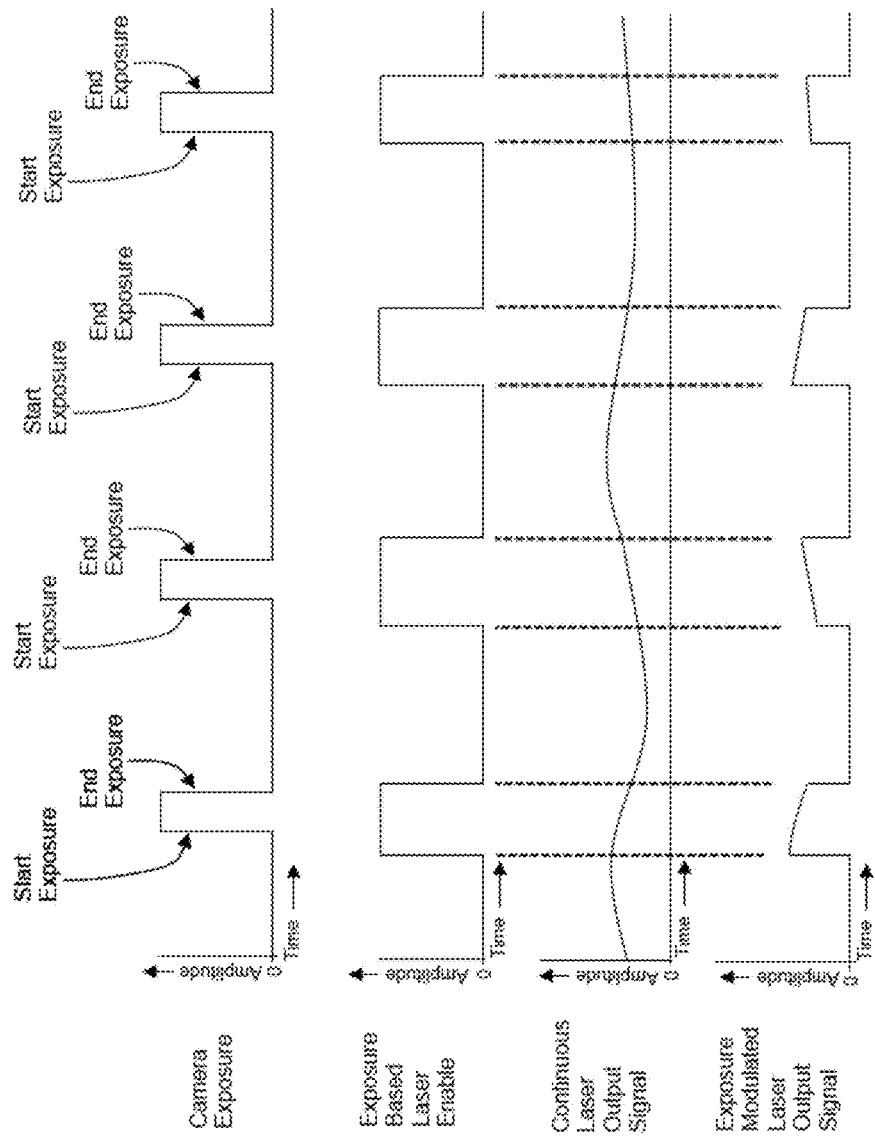
FIG. 10 graphically shows a light emission power control algorithm modulated laser power output signal derived from a 3D sensor exposure signal and a continuous variable laser power output signal.

With reference to FIG. 9 and FIG. 10, in addition to enabling and disabling the light emitting apparatus 16 based on whether the system 86 is moving at a minimum speed, another consideration is to further limit ocular exposure by only enabling the light emitting apparatus 16 during times when the 3D sensor 38 is gathering image profiles from an adjacent railway track bed. By further limiting the time when the light emitting apparatus 16 is enabled based on 3D sensor 38 exposure time periods, the amount of undesirable light exposure can be dramatically decreased (in some cases by about 80%) because, under typical circumstances, the 3D sensor 38 exposure time only accounts for a small fraction of the total time during normal operating conditions. FIG. 10 shows a graphical representation of enabling and disabling the light emitting apparatus 16 to limit ocular exposure. The top graph shown as "Camera Exposure" shows a graph of the 3D sensor exposure times, the snippets of time when the 3D sensor is gathering image profiles of an adjacent railway track bed. The graph entitled "Exposure Based Laser Enable" shows the time periods when the light emitting apparatus 16 is enabled and disabled. The time periods when the light emitting apparatus 16 is enabled are slightly longer at the beginning and ending than the exposure times for the 3D sensor because it is important to ensure that the light emitting apparatus 16 is fully enabled during the entirety of the 3D sensor exposure times. "Slightly longer" as used herein refers to a time duration of preferably about 1 millisecond to about 50 milliseconds, and more preferably of from about 1 millisecond to about 5 milliseconds, dependent on laser emitting apparatus characteristics.

Additionally, in one preferred embodiment, data from various embodiments described herein are combined. A third graph of FIG. 10 labeled "Continuous Laser Output Signal" shows the output signal of the system 86 generally sent to the controller 92 as the power of the light emitting apparatus 16 is adjusted to compensate for changes in track bed color and texture variations. An example of this adjustment to the output signal is shown in a flowchart in FIG. 8 and is discussed at length above in other related embodiments. Finally, the graph at the bottom labeled "Exposure Modulated Laser Output Signal" is the fully modulated signal sent to the controller 92 by the processor 90 taking into account both the exposure times of the 3D sensor 38 and the continuous laser output signal. When the 3D sensor 38 is not actively gathering a 3D profile, the light emitting apparatus is deactivated. While the 3D sensor is actively gathering a 3D profile, the laser power control is adjusted based on feedback from the 3D sensor as shown for example in FIGS. 2-5.

The timing and sequencing of the 3D sensor 38 and the light emitting apparatus 16 is accomplished using a device that can track a speed of the system 86 (and therefore a distance traveled) such as a motion detection device 88. In a preferred embodiment, a shaft encoder is used as described above in previous embodiments. The processor 90 communicates with the 3D sensor 38 and provides command signals to activate the 3D sensor for exposure times based on pulses gathered from the shaft encoder. At the same time, the processor 90 provides command signals to the controller 92 to control when the light emitting apparatus 16 is enabled or disabled and these command signals are also based on pulses gathered from the shaft encoder. The processor manages the timing of the devices so that the light emitting apparatus 16 is enabled slightly before a 3D sensor 38 exposure and the light emitting apparatus 16 remains enabled until slightly after the 3D sensor exposure is completed. "Slightly before" and "slightly after" are defined herein as time durations ranging preferably from about 1 millisecond to about 50 milliseconds, and more preferably from about 1 to about 5 milliseconds dependent on laser emitting apparatus characteristics. In this way, light exposure is substantially decreased because the light emitting apparatus 16 is only active during an exposure time duration when the 3D sensor 38 is gathering profile data.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for inspecting a railway track configured to adjust the intensity of a light emitting apparatus based on the motion of the system relative to an adjacent railway track wherein the system is mounted to a railway track vehicle, the system comprising:
    a power source;
    a light emitting apparatus powered by the power source for emitting light energy toward a railway track;
    at least one 3D sensor for sensing reflected light emitted from the light emitting apparatus and acquiring three-dimensional data of the railway track;
    at least one shaft encoder for detecting motion of a wheel of the railway track vehicle on which the system is mounted, the shaft encoder emitting pulses at a rate that corresponds to a speed at which the wheel of the railway track vehicle rotates which corresponds to a speed of the railway track vehicle; and
    a processor in communication with the at least one 3D sensor and at least one shaft encoder wherein the processor includes an algorithm for adjusting the power of the light emitting apparatus, the algorithm comprising the steps of:
        a. analyzing the three-dimensional data from the at least one 3D sensor;
        b. receiving pulses emitted from the at least one shaft encoder; and
        c. adjusting a light emitter control output value based at least in part on the analyzed three-dimensional data and the received pulses; and
    a controller in communication with the processor wherein the controller is configured to control the light intensity of the light emitting apparatus in response to the light emitter control output value.

2. The system of claim 1 wherein the 3D sensor acquires a plurality of 3D profiles in the form of 3D sensor exposures wherein each 3D sensor exposure occurs during an exposure time duration including a start exposure time when the exposure time duration begins and an end exposure time when the exposure time duration ends, and wherein each 3D sensor exposure is triggered by a pulse emitted from the shaft encoder.

3. The system of claim 2 wherein the algorithm for adjusting the power of the light emitting apparatus further comprises the step of enabling or disabling the power to the light emitting apparatus at different times based on the timing of the received pulses from the at least one shaft encoder.

4. The system of claim 3 wherein the algorithm for adjusting the power of the light emitting apparatus further comprises the step of adjusting the light emitter control output value at the start exposure time to cause the controller to enable power to the light emitting apparatus and adjusting the light emitter control output value at the end exposure time to cause the controller to disable power to the light emitting apparatus.

5. The system of claim 4 wherein the processor causes each 3D sensor exposure to begin slightly after power to the light emitting apparatus is enabled and end slightly before power to the light emitting apparatus is disabled, thereby ensuring that the light emitting apparatus is fully enabled for the entire duration of each 3D sensor exposure.

6. A system for inspecting a railway track configured to adjust the intensity of a light emitting apparatus based on the motion of the system relative to an adjacent railway track wherein the system is mounted to a railway track vehicle, the system comprising:
  a power source;
  a light emitting apparatus powered by the power source for emitting light energy toward a railway track;
  at least one 3D sensor for sensing reflected light emitted from the light emitting apparatus and acquiring three-dimensional data of the railway track;
  at least one motion detection apparatus for detecting the motion of the railway track vehicle on which the system is mounted, the motion detection apparatus providing signals at a rate that corresponds to the speed at which the railway track vehicle is moving; and
  a processor in communication with the at least one 3D sensor and the at least one motion detection apparatus wherein the processor includes an algorithm for adjusting the power of the light emitting apparatus, the algorithm comprising the steps of:
    a. receiving signals from the at least one motion detection apparatus; and
    b. adjusting a light emitter control output value based at least in part on the received signals; and
  a controller in communication with the processor wherein the controller is configured to control the light intensity of the light emitting apparatus in response to the light emitter control output value.

7. The system of claim 6 wherein the 3D sensor acquires a plurality of 3D profiles in the form of 3D sensor exposures wherein each 3D sensor exposure occurs during an exposure time duration including a start exposure time when the exposure time duration begins and an end exposure time when the exposure time duration ends, and wherein each 3D sensor exposure is triggered by a signal from the at least one motion detection apparatus.

8. The system of claim 7 wherein the algorithm for adjusting the power of the light emitting apparatus further comprises the step of enabling or disabling the power to the light emitting apparatus at different times based on the timing of the received signals from the at least one motion detection apparatus.

9. The system of claim 8 wherein the algorithm for adjusting the power of the light emitting apparatus further comprises the step of adjusting the light emitter control output value at the start exposure time to cause the controller to enable power to the light emitting apparatus and adjusting the light emitter control output value at the end exposure time to cause the controller to disable power to the light emitting apparatus.

10. The system of claim 9 wherein the processor causes each 3D sensor exposure to begin slightly after power to the emitting apparatus is enabled and end slightly before power to the emitting apparatus disabled, thereby ensuring that the light emitting apparatus is fully enabled for the entire duration of each 3D sensor exposure.

11. A method of inspecting a railway track bed using a light source with real time adjustable light emission, the method comprising the steps of:
  a. emitting light from a mobile inspection system mounted to a railway track vehicle, the mobile inspection system comprising a processor, a controller which operates based on commands from the processor, a light source controlled by the controller, a motion detection apparatus for providing signals to the processor regarding the motion of the railway track vehicle relative to an adjacent railway track bed, and a 3D sensor for capturing and sending image profiles of the adjacent railway track bed to the processor wherein the emitted light is emitted toward the adjacent railway track bed for detection by the 3D sensor;
  b. sending signals from the motion detection apparatus to the processor;
  c. adjusting a light emitter control output value using the processor wherein such adjusting is based on the signals sent from the motion detection apparatus to the processor; and
  d. controlling the light intensity of the light emitting apparatus in response to the adjusted light emitter control output value.

12. The method of claim 11 wherein the step of sending signals from the motion detection apparatus comprises sending pulses from a shaft encoder to the processor.

13. The method of claim 11 wherein the method further comprises the step of disabling the light source for discrete periods of time based on the signals sent from the motion detection apparatus to the processor.

14. The method of claim 13 wherein the discrete periods of time during which the light emitter is disabled correspond to periods of time when the 3D sensor is not capturing an image profile.

15. The method of claim 14 further comprising the step of analyzing the image profiles gathered by the at least one 3D sensor and wherein the adjusting step further comprises adjusting the light emitter control output value using the processor based on the profiles gathered by the at least one 3D sensor.

16. The method of claim 13 wherein the method further comprises the step of enabling the light source for discrete periods of time starting at a time slightly before the 3D sensor captures an image profile and slightly after the 3D sensor has captured an image profile.

17. The method of claim 16 further comprising the step of analyzing the image profiles gathered by the at least one 3D sensor and wherein the adjusting step further comprises adjusting the light emitter control output value using the processor based on the profiles gathered by the at least one 3D sensor.

* * * * *